United States Patent [19]

Pedersen et al.

[11] 4,021,135

[45] May 3, 1977

[54] WIND TURBINE

[76] Inventors: Nicholas F. Pedersen, 3199 Sturbridge, Farmington, Mich. 48024; Gaylord O. Ellis, 61 Bellarmine Drive, Rochester, Mich. 48063

[22] Filed: Oct. 9, 1975

[21] Appl. No.: 621,036

[52] U.S. Cl. .................... 415/2; 415/209; 290/55

[51] Int. Cl.² .......................................... F03D 7/00

[58] Field of Search ................... 415/1–4, 415/209; 290/55

[56] References Cited

UNITED STATES PATENTS

| 1,186,289 | 6/1916 | Dalen | 415/2 |
| 1,536,754 | 5/1925 | Benson | 415/209 |
| 2,650,752 | 9/1953 | Hoadley | 415/209 |
| 3,986,787 | 10/1976 | Mouton, Jr. et al. | 415/7 |

FOREIGN PATENTS OR APPLICATIONS

| 891,697 | 3/1944 | France | 415/DIG. 1 |
| 935,673 | 6/1948 | France | 415/2 |
| 975,625 | 3/1951 | France | 415/2 |
| 1,007,883 | 4/1948 | France | 415/4 |
| 883,428 | 7/1953 | Germany | 415/2 |

*Primary Examiner*—Henry F. Raduazo
*Attorney, Agent, or Firm*—Barnes, Kisselle, Raisch & Choate

[57] ABSTRACT

A wind turbine including a reaction type turbine wheel instead of an impulse type turbine which is normally used for receiving the wind and more efficiently deriving power therefrom and an augmenter means for producing a vortex downstream of the turbine at the exit of the turbine to increase the pressure differential across the turbine thereby increasing the power that may be extracted from the wind.

14 Claims, 5 Drawing Figures

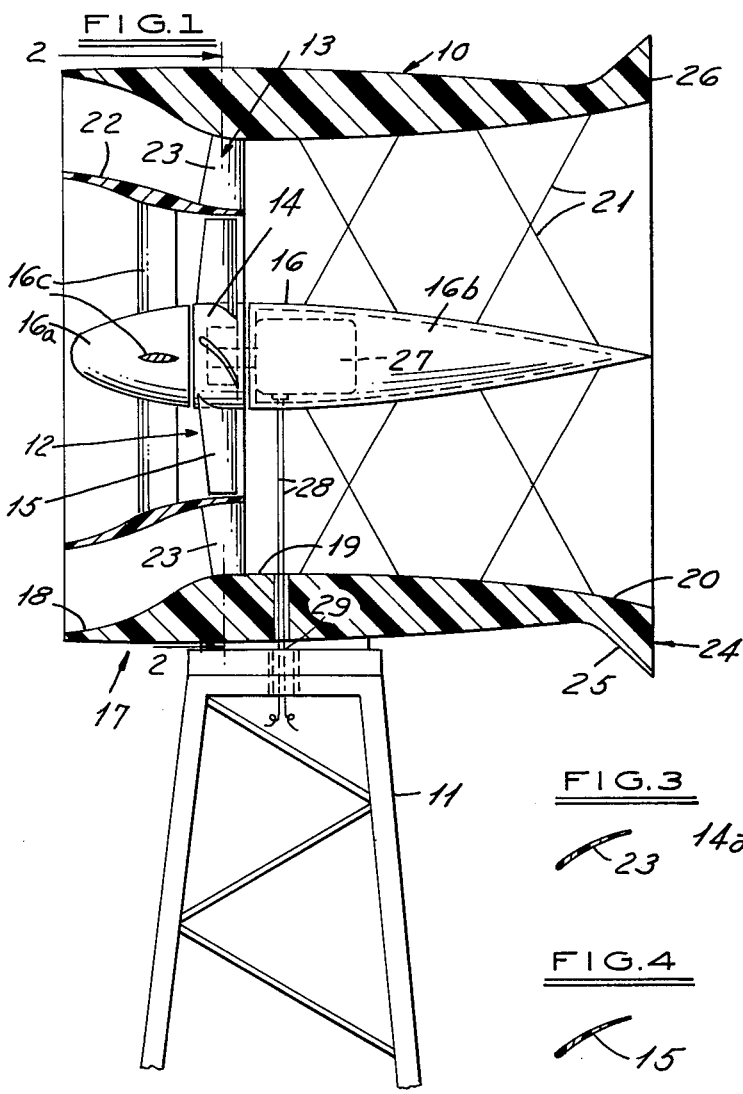
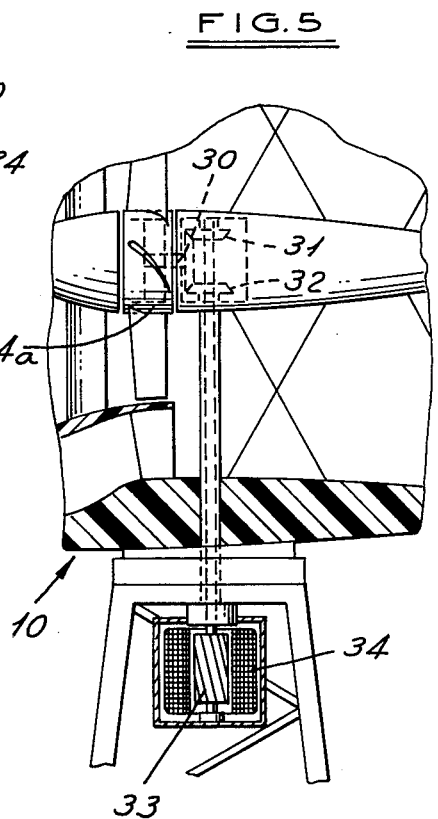
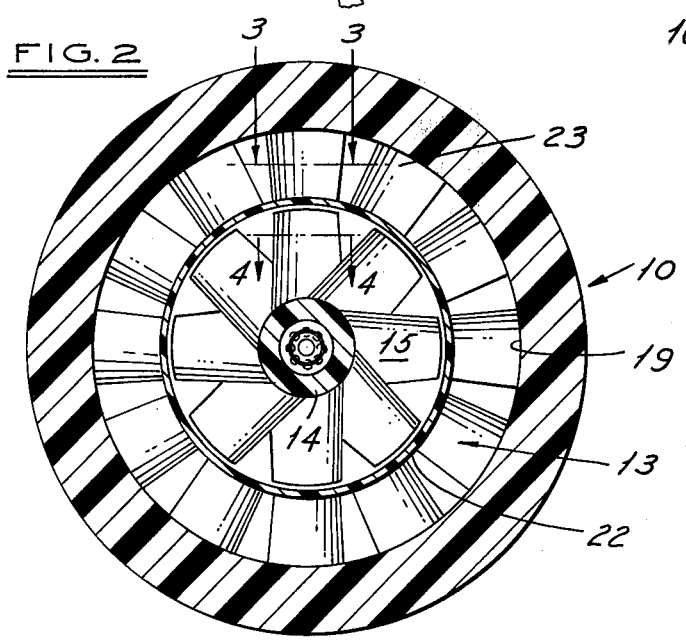

WIND TURBINE

This invention relates to wind turbines.

BACKGROUND OF THE INVENTION

In view of the energy problems that have arisen, there has been considerable interest in wind power to produce a useful energy. The greatest activity has been directed toward improvement of the aerodynamics of propellor-type turbines which were formerly known as windmills and are now known as wind turbines.

Among the objects of the invention are to provide an improved wind turbine of novel design which produces output power that is significantly greater than the output power from a conventional inpulse wind turbine of the same general size; which wind turbine can be readily manufactured; and which wind turbine will require minimal maintenance and service.

SUMMARY OF THE INVENTION

In accordance with the invention, the wind turbine including a reaction type turbine wheel instead of an impulse type turbine which is normally used for receiving the wind and more efficiently deriving power therefrom and an augmenter means for producing a vortex downstream of the turbine at the exit of the turbine to increase the pressure differential across the turbine thereby increasing the power that may be extracted from the wind.

DESCRIPTION OF THE DRAWINGS

FIG. 1 is a fragmentary part sectional view of a wind turbine embodying the invention.

FIG. 2 is a sectional view taken along the line 2—2 in FIG. 1.

FIG. 3 is a sectional view taken along the line 3—3 in FIG. 2.

FIG. 4 is a sectional view taken along the line 4—4 in FIG. 2.

FIG. 5 is a fragmentary sectional view of a modified form of the invention.

DESCRIPTION

Referring to FIG. 1, the wind turbine 10 embodying the invention is adapted to be supported on a suitable vertical mast or similar structure 11 and is rotatably mounted thereon by bearings so that it will be rotated by the wind.

Basically the wind turbine 10 includes a reaction type turbine 12 and a vortex augmenter 13.

More specifically, the reaction turbine 12 includes a rotor 14 having a plurality of reaction-type blades 15 extending radially therefrom and rotatably mounted by suitable bearings on a housing 16. Housing 16 includes a first fixed part 16a upstream of the turbine rotor 14 and a second part 16b downstream of the turbine rotor 14. The housing part 16a, turbine rotor 14, and housing part 16b define an aerodynamically shaped bullet or torpedo. A first double wall cowling 17 is provided and incorporates a converging portion 18, a central portion 19 and a diverging portion 20. The housing 16b is supported within the cowling 17 by tensioned wires 21. A second double wall cowling 22, which is internally generally converging, is supported concentrically with the converging portion 18 of first cowling 17 by circumferentially spaced fixed blades 23 fixed to and extending between the interior of the converging portion 18 and the exterior of the second cowling 22. Housing part 16a is supported on cowling 22 by radial blades 16c which also function as air straighteners to inhibit pre-swirling of the air passing to turbine rotor 14.

The blades 15 are suitably curved to deflect the air or wind as in a reaction type turbine. The blades 23 of the vortex generator are also suitably curved and at an angle such as to produce a vortex rotating in the same direction as the air emanating from the blades 15. It is preferred that the angle be approximately 60°.

In operation, the wind entering the cowling 22 rotates the blades 15 and the rotor 14. The wind entering between the cowling 22 and the converging portion 18 of cowling 17 is caused to change in direction producing a swirling or vortex action within the central portion 19 of cowling 17. This causes a reduction in pressure at the center of the swirling vortex and thereby augments the differential pressure between the inlet and the outlet of the turbine 12 and increases the power which is derived therefrom.

In order to minimize the pressure differential and velocity differential between the ambient air surrounding the housing 17 and the air emanating from within the housing 17, a spoiler 24 is provided at the periphery of the diverging portion 20 and includes an inclined surface 25 that gradually directs the ambient air radially outwardly and a radial surface 26. By this action, the air is caused to have a change in direct velocity and pressure more closely approaching the pressure and velocity of the air at the outer edge of the vortex emanating from within the housing 20. A preferred angle for diverting the air by the spoiler 24 is about 68°.

Power may be derived from the rotor 14 in any suitable manner, for example such as by driving a generator 27 within the housing 16 and then having a electrical power therefrom carried through a line 28 and a slip ring construction 29 to the use to which it is intended.

As shown in FIG. 5, the power can also be derived by having the rotor 14a drive a pinion 30 of a differential gearing arrangement including gears 31, 32, the gear 31 in turn driving the rotor 33 of a generator while the gear 32 drives the stator 34 thereby eliminating any torque that might tend to rotate the wind turbine.

Although I do not wish to be bound by the theory involved, in my opinion, the beneficial results derived from the invention can be explained as follows:

The vortex augmented reaction wind turbine depends for its function on two concentric air streams. The inner air stream passes directly through the rotating wind turbine 12. The outer air stream passes through a set of fixed vortex generator blades 23. The two air streams join at the exit of the turbine to form a swirling air mass, known as a free vortex. This free vortex flows toward the exit end of a diffuser section 20 where it joins the surrounding ambient air. To function as an energy extracting machine, the air column passing through the device must meet certain boundary conditions at the exit of the diffuser.

The boundary conditions are:
1. Pressure in the exit at the outer periphery of the diffuser must be equal to the ambient air at this point.
2. Axial velocity of the air stream must be equal to or nearly equal to the axial velocity of the ambient air.

In addition to these boundary conditions, the following must also be true:

An integration of the pressure gradient across the exit area of the diffuser must show a pressure change consistent with the energy remove.

The vortex augmented reaction wind turbine functions in the following manner:

Air enters the outer concentric passage due to the velocity of the wind. It flows axially into a converging section attaining additional velocity and with reduced pressure.

The swirl vanes or vortex generators 23 are part of this converging section. As the air is caused to turn through an angle to the axis of the machine, the effective area of the flow passage is further reduced. The air is therefore discharged from the vortex generators at a maximum velocity and a maximum angle to the axis of the machine that is consistent with turbine discharge flow, that is, the axial velocity out of the turbine is matched to the axial velocity out of the vortex generators.

Since the reaction turbine is used, the pressure differential across the turbine causes a flow through the blades 15. The blades 15 are shaped to turn the flow at an angle to the axis of the machine and at the same time increase the relative flow velocity. The resulting combined acceleration produces a force reaction on the blades 15. This reaction force develops a torque and turns the turbine disc.

We claim:

1. In a wind turbine, a reaction turbine comprising blades for receiving the wind and deriving power therefrom and augmenter means for producing a vortex downstream of the turbine at the exit of the turbine,
   said augmenting means comprising a plurality of fixed blades in the path of the wind,
   a first cowling surrounding the turbine, said vortex augmenting means surrounding said cowling,
   a second cowling surrounding said augmenting means,
   said blades of said augmenting means extending between said cowlings,
   said blades of said augmenting means being angularly related with respect to the axis of the wind turbine in the same direction as the blades of the reaction turbine,
   said cowling surrounding said augmenting means including an inlet, a central portion and an outlet defining a venturi, said reaction turbine being adjacent said central portion of the second cowling,
   said second cowling extending substantially from the inlet to the turbine in spaced relationship to the first-mentioned cowling.

2. The combination set forth in claim 1 wherein said fixed blades are of substantially uniform thickness.

3. The combination set forth in claim 2 wherein said fixed blades form an angle such that they redirect the air at approximately 60°.

4. The combination set forth in claim 1 including a spoiler at the outlet of the first-mentioned cowling extending generally radially outwardly.

5. The combination set forth in claim 4 wherein said spoiler diverts the air surrounding said cowling at approximately 68°.

6. The combination set forth in claim 1 wherein said reaction turbine and said vortex augmenting means includes blades constructed and arranged such that the axial velocity of the vortex is slightly greater than the axial velocity of the exit from the reaction turbine.

7. The combination set forth in claim 1 wherein the diameter of the first-mentioned cowling at the inlet is greater than the diameter at the outlet.

8. The combination set forth in claim 1 including a stationary housing part concentric with and in advance of said turbine and radial blades supporting said housing part and defining air straighteners.

9. In a wind turbine, a reaction type turbine having blades for receiving the wind and deriving power therefrom and augmenting means for receiving wind for producing a vortex downstream of the reaction turbine at the exit of the reaction turbine, concentric with the reaction turbine and rotating in the same direction as the air emanating from the reaction turbine,
   a cowling surrounding the turbine, said augmenting means surrounding said cowling,
   another cowling surrounding said augmenting means,
   said cowling surrounding said augmenting means includes an inlet, a central portion and an outlet, said reaction turbine being adjacent said central portion of said cowling surrounding said augmenting means.

10. The combination set forth in claim 9 wherein said cowling surrounding said augmenting means extends substantially from the inlet to the turbine in spaced relationship to the first-mentioned cowling.

11. The combination set forth in claim 10 including a spoiler at the outlet of said cowling surrounding said augmenting means extending generally radially outwardly.

12. The combination set forth in claim 11 wherein said spoiler diverts the air surrounding said cowling at approximately 68°.

13. The combination set forth in claim 10 wherein the diameter of said cowling surrounding said augmenting means at the inlet is greater than the diameter at the outlet.

14. The combination set forth in claim 13 including power take-off means from said reaction turbine.

* * * * *